United States Patent
Jeon et al.

(10) Patent No.: US 12,170,925 B2
(45) Date of Patent: Dec. 17, 2024

(54) NETWORK NODES FOR HANDLING NON-FULFILLMENT OF QoS REQUIREMENTS

(71) Applicant: Huawei Technologies Co., Ltd., Shenzhen (CN)

(72) Inventors: Seil Jeon, Kista (SE); Siva Vakeesar, Kista (SE); Ali Hamidian, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 530 days.

(21) Appl. No.: 17/453,791

(22) Filed: Nov. 5, 2021

(65) Prior Publication Data

US 2022/0060942 A1    Feb. 24, 2022

Related U.S. Application Data (63) Continuation of application No. PCT/EP2019/061524, filed on May 6, 2019.

(51) Int. Cl.
*H04W 28/08* (2023.01)
*H04W 28/02* (2009.01)

(52) U.S. Cl.
CPC ... *H04W 28/0967* (2020.05); *H04W 28/0268* (2013.01); *H04W 28/0925* (2020.05)

(58) Field of Classification Search
CPC ............. H04L 43/0852; H04L 41/5025; H04L 43/0894; H04L 43/0835; H04W 28/0925; H04W 28/0268; H04W 28/0967
See application file for complete search history.

(56) References Cited

U.S. PATENT DOCUMENTS

| | | | | |
|---|---|---|---|---|
| 2009/0125631 A1* | 5/2009 | Blom | ................... | H04L 47/2491 709/228 |
| 2018/0192337 A1* | 7/2018 | Ryu | ................... | H04W 36/0066 |
| 2019/0021064 A1* | 1/2019 | Ryu | ....................... | H04W 60/06 |

(Continued)

FOREIGN PATENT DOCUMENTS

EP    1574965 B1 *    6/2007    ......... G06F 15/7825

OTHER PUBLICATIONS

China Telecom, "TR23.791: Solution to QoS Profile Provisioning and adjustment", SA WG2 Meeting #128, S2-186676, Vilnius, Lighuania, Jul. 2-6, 2018, 2 pages.

(Continued)

*Primary Examiner* — Mehmood B. Khan
(74) *Attorney, Agent, or Firm* — Slater Matsil, LLP (57) ABSTRACT

The invention relates to network nodes for handling non-fulfilment of QoS requirements in wireless communication systems. A first network node obtains QoS requirements associated with a PDU session of a client device application. When the QoS requirements will not be met in a core network, the first network node transmits a first QoS notification to a second network node, wherein the first QoS notification indicates that the one or more QoS requirements will not be met in the core network. When the QoS requirements will not be met in a radio access network, the first network node transmits a second QoS notification to a master node, wherein the second QoS notification indicates that the one or more QoS requirements will not be met in the radio access network. Furthermore, the invention also relates to corresponding methods and computer program.

20 Claims, 8 Drawing Sheets

(56) References Cited

U.S. PATENT DOCUMENTS

| | | | | |
|---|---|---|---|---|
| 2019/0174449 | A1* | 6/2019 | Shan | H04W 60/04 |
| 2019/0254094 | A1* | 8/2019 | Babu | H04W 76/11 |
| 2019/0297121 | A1* | 9/2019 | Qiao | H04L 65/1016 |
| 2019/0335392 | A1* | 10/2019 | Qiao | H04W 48/16 |
| 2019/0387401 | A1* | 12/2019 | Liao | H04W 4/08 |
| 2019/0394833 | A1* | 12/2019 | Talebi Fard | H04W 68/005 |
| 2021/0029618 | A1* | 1/2021 | Jain | H04W 48/02 |
| 2021/0274385 | A1* | 9/2021 | Zhang | H04W 28/0284 |

OTHER PUBLICATIONS

3GPP TS 23.288 V0.4.0 (Apr. 2019), 3rd Generation Partnership Project, Technical Specification Group Services and System Aspects, Architecture enhancements for 5G System (5GS) to support network data analytics services (Release 16), Sophia Antipolis, Valbonne, France, 48 pages.

5GAAWG2, "LS on Requirements to enable Predictive QoS for Automotive industry", SA WG2 Meeting #S2-129, S2-1810010, Dongguan, P.R. China, Oct. 15-19, 2018, 10 pages.

3GPP TS 23.501 V16.0.2 (Apr. 2019), 3rd Generation Partnership Project, Technical Specification Group Services and System Aspects, System Architecture for the 5G System, Stage 2 (Release 16), Sophia Antipolis, Valbonne, France, 317 pages.

LG Electronics et al., "Solution#29 update", 3GPP TSG-SA WG2 Meeting #132, S2-1904450, Xi'an, China, Apr. 8-12, 2019, 6 pages.

3GPP TS 23.502 V16.0.2 (Apr. 2019), 3rd Generation Partnership Project, Technical Specification Group Services and System Aspects, Procedures for the 5G System, Stage 2 (Release 16), Sophia Antipolis, Valbonne ,France, 419 pages.

Nokia et al., "5G URLLC: Optimizing Redundancy", SA WG2 Meeting #132, S2-1904696,Apr. 8-12, 2019, Xi'an, PRC, Total 6 pages.

3GPP TR 23.725 V16.1.0 (Mar. 2019), 3rd Generation Partnership Project, Technical Specification Group Services and System Aspects, Study on enhancement of Ultra-Reliable Low-Latency Communication (URLLC) support in the 5G Core network (5GC) (Release 16), Sophia Antipolis, Valbonne, France, 91 pages.

3GPP TR 23.786 V16.0.0 (Mar. 2019), 3rd Generation Partnership Project, Technical Specification Group Services and System Aspects, Study on architecture enhancements for the Evolved Packet System (EPS) and the 5G System (5GS) to support advanced V2X services (Release 16), Sophia Antipolis, Valbonne, France, 118 pages.

3GPP TS 36.331 V15.5.1 (Apr. 2019), 3rd Generation Partnership Project, Technical Specification Group Radio Access Network, Evolved Universal Terrestrial Radio Access (E-UTRA), Radio Resource Control (RRC), Protocol specification (Release 15), Sophia Antipolis, Valbonne, France, 948 pages.

3GPP TS 36.413 V15.5.0 (Mar. 2019), 3rd Generation Partnership Project, Technical Specification Group Radio Access Network, Evolved Universal Terrestrial Radio Access Network(E-UTRAN), S1 Application Protocol (S1AP) (Release 15), Sophia Antipolis, Valbonne, France, 388 pages.

3GPP TS 37.340 V15.5.0 (Mar. 2019), 3rd Generation Partnership Project, Technical Specification Group Radio Access Network, Evolved Universal Terrestrial Radio Access (E-UTRA) and NR, Multi-connectivity, Stage 2 (Release 15), Sophia Antipolis, Valbonne, France, 68 pages.

3GPP TR 23.791 V16.1.0 (Mar. 2019), 3rd Generation Partnership Project;Technical Specification Group Services and System Aspects; Study of Enablers for Network Automation for 5G (Release 16), 124 pages.

* cited by examiner

NETWORK NODES FOR HANDLING NON-FULFILLMENT OF QoS REQUIREMENTS

CROSS-REFERENCE TO RELATED APPLICATIONS

This application is a continuation of International Application No. PCT/EP2019/061524, filed on May 6, 2019, the disclosure of which is hereby incorporated by reference in its entirety.

TECHNICAL FIELD

The invention relates to network nodes for handling non-fulfilment of QoS requirements in wireless communication systems. Furthermore, the invention also relates to corresponding methods and computer program.

BACKGROUND

3GPP 5G, also known as New Radio (NR), is targeted to extend operator's business scope into vertical domains. Vertical use cases require low latency, high reliability, and high throughput. So, managing Quality of Service (QoS) is one of the most critical and challenging aspects for 5G to be widely used in vertical industries. In particular, for cellular vehicle-to-everything (C-V2X) and connected industry, it is hard to guarantee pre-agreed challenging QoS key performance indicators (KPIs) such as throughput, latency, and packet delivery ratio 100% all the times.

The intention of a QoS prediction mechanism is to notify a user equipment (UE) or a V2X application when the expected QoS requirements are predicted not to be met, in order to enable the application to prepare and execute countermeasures in the UE or UE's application. Those countermeasures can be called application reactions which can be for example modifying a packet data unit (PDU) session with lower QoS configuration or changing the level of automation in autonomous driving or reducing the operation speed of the machine/vehicle, and so on, in advance before the actual QoS degradation happens. The application can start taking such proactive countermeasures on receiving a QoS prediction notification, called In-advance QoS Notification (IQN) which can be generated by an appropriate Network Function (NF) belonging to the 5G system, such as Network Data Analytics Function (NWDAF). Although IQN is generated as a result of prediction, in this disclosure, both terms, QoS prediction and IQN can be interchangeably used. As a result, the UE can avoid an undesired situation (e.g., safety-related accident), and overall system reliability can be improved.

SUMMARY

3GPP 5G, also known as New Radio (NR), is targeted to extend operator's business scope into vertical domains. Vertical use cases require low latency, high reliability, and high throughput. So, managing Quality of Service (QoS) is one of the most critical and challenging aspects for 5G to be widely used in vertical industries. In particular, for cellular vehicle-to-everything (C-V2X) and connected industry, it is hard to guarantee pre-agreed challenging QoS key performance indicators (KPIs) such as throughput, latency, and packet delivery ratio 100% all the times.

The intention of a QoS prediction mechanism is to notify a user equipment (UE) or a V2X application when the expected QoS requirements are predicted not to be met, in order to enable the application to prepare and execute countermeasures in the UE or UE's application. Those countermeasures can be called application reactions which can be for example modifying a packet data unit (PDU) session with lower QoS configuration or changing the level of automation in autonomous driving or reducing the operation speed of the machine/vehicle, and so on, in advance before the actual QoS degradation happens. The application can start taking such proactive countermeasures on receiving a QoS prediction notification, called In-advance QoS Notification (IQN) which can be generated by an appropriate Network Function (NF) belonging to the 5G system, such as Network Data Analytics Function (NWDAF). Although IQN is generated as a result of prediction, in this disclosure, both terms, QoS prediction and IQN can be interchangeably used. As a result, the UE can avoid an undesired situation (e.g., safety-related accident), and overall system reliability can be improved.

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a first network node for a wireless communication system, the first network node being configured to obtain one or more Quality-of-Service, QoS, requirements associated with a protocol data unit, PDU, session of a client device application; the first network node further being configured to at least one of: when the one or more QoS requirements will not be met in a core network, transmit a first QoS notification to a second network node, wherein the first QoS notification indicates that the one or more QoS requirements will not be met in the core network; and when the one or more QoS requirements will not be met in a radio access network, transmit a second QoS notification to a master node, wherein the second QoS notification indicates that the one or more QoS requirements will not be met in the radio access network.

It is to be understood that the first network node is configured to transmit a first QoS notification to a second network node when the one or more QoS requirements will not be met in the core network and/or transmit a second QoS notification to a master node when the one or more QoS requirements will not be met in the radio access network.

The client device application herein can be any suitable application, such as a V2X application running in a vehicular client device or an industrial application running in connected industry environment with automation or a general application running in a client device.

An advantage of the first network node according to the first aspect is that by checking QoS requirements of the client device or PDU session of the client device, and to determine whether QoS requirements can be met in the core network or in the radio access network, the first network node is in the position to trigger an appropriate corrective action with the core network node or the radio access network when the QoS requirement is not going to be met. Thereby, the necessity of having to downgrade the QoS of the currently active PDU session might be minimized or fully avoided.

In an implementation form of a first network node according to the first aspect, when the one or more QoS requirements will not be met in the core network comprises determine that the one or more QoS requirements will not be met in the core network based on the obtained one or more QoS requirements and one or more QoS threshold values associated with the core network; and when the one or more QoS requirements will not be met in the radio access network comprises determine that the one or more QoS requirements will not be met in the radio access network based on the obtained QoS requirements and one or more QoS threshold values associated with the radio access network.

An advantage with this implementation form is that the first network node can trigger the second network node for initiating traffic redundancy that establishes one or more redundant traffic paths for one or more identified PDU sessions, when it is determined by the first network node that the QoS requirement is not going to be met in the core network. Further, the first network node can also trigger the master node for initiating dual connectivity that allocates radio resource of one or more secondary nodes for one or more identified PDU sessions or QoS flows, when it is determined by the first network node that the QoS requirement is not going to be met in the radio access network.

In an implementation form of a first network node according to the first aspect, the one or more threshold values associated with the core network are one or more of: data rate, latency, and reliability or packet delivery ratio; and wherein the one or more threshold values associated with the radio access network are one or more of: data rate, latency, and reliability or packet delivery ratio.

An advantage with this implementation form is that the first network node predicts or estimates the future QoS in terms of data rate, latency, and reliability or packet delivery ratio, and triggers corrective actions such as initiating traffic redundancy and dual connectivity.

In an implementation form of a first network node according to the first aspect, the first QoS notification further indicates one or more of: a PDU session identity, a client device Internet Protocol address, an Internal Group identity, an Application Function Transaction identity, and a Data Network Name.

An advantage with this implementation form is that the first network node provides the extended information to the second network node so that the second network node can identify one or more correct PDU sessions for which traffic redundancy has to be initiated.

In an implementation form of a first network node according to the first aspect, the second QoS notification further indicates one or more of QoS Flow Identifier (QFI) list, QoS profile of each QFI, PDU session identity, a list of suggested secondary nodes, a PDU session level Transport Network Layer, TNL, address, and a PDU session level network slice information of the suggested secondary nodes.

An advantage with this implementation form is that the first network node provides the extended information to the master node so that the master node can identify one or more the correct PDU sessions or QoS flows for which dual connectivity has to be initiated.

In an implementation form of a first network node according to the first aspect, the second QoS notification is transmitted to the master node via an access and mobility management function.

An advantage with this implementation form is that the first network node can reuse the existing interface between the access and mobility management function and the master node to deliver the second QoS notification. Thereby, a backwards compatible solution is provided and no new interface has to be defined which can be challenging from a system design point of view.

In an implementation form of a first network node according to the first aspect, the first network node being configured to obtain a client device capability indication from the master node, wherein the client device capability indication indicates the capabilities of the client device.

An advantage with this implementation form is that the first network node can identify whether the client device supports dual connectivity or not and/or which types of dual connectivity that are supported by the client device. Further, which secondary nodes that can be matched with the client device capability can be determined by the first network node.

In an implementation form of a first network node according to the first aspect, the first network node being configured to receive the client device capability indication from the access and mobility management function in response to a transmission of a client device capability enquiry to the access and mobility management function.

An advantage with this implementation form is that the first network node can reuse the existing procedure between the access and mobility management function and the master node in terms of obtaining the client device capability, without defining a new procedure between the first network node and the client device, which will have a procedural impact on the client device.

In an implementation form of a first network node according to the first aspect, the client device capability indication indicates supported radio access frequencies of the client device.

An advantage with this implementation form is that the first network node can identify whether the client device supports dual connectivity or not and/or which types of dual connectivity that are supported by the client device. Further, which secondary nodes that can be matched with the client device capability can be determined by the first network node.

According to a second aspect of the invention, the above mentioned and other objectives are achieved with a second network node for a wireless communication system, the second network node being configured to receive a first QoS notification from a first network node, wherein the first QoS notification indicates that one or more QoS requirements associated with a PDU session of a client device application will not be met in a core network; set up one or more traffic paths for the PDU session or establish an additional PDU session for the client device application based on the first QoS notification.

An advantage of the second network node according to the second aspect is that through the first QoS notification received from the first network node, the second network node can trigger a corrective action, such as initiating traffic redundancy. Thereby, the necessity of having to downgrade the QoS of a currently active PDU session might be minimized or fully avoided.

In an implementation form of a second network node according to the second aspect, the first QoS notification further indicates one or more of: a PDU session identity, a client device Internet Protocol address, an Internal Group identity, an Application Function Transaction identity, and a Data Network Name.

An advantage with this implementation form is that the first network node provides extended information to the second network node so that the second network node can identify one or more correct PDU sessions for which traffic redundancy has to be initiated.

According to a third aspect of the invention, the above mentioned and other objectives are achieved with a master node for a wireless communication system, the master node being configured to receive a second QoS notification from a first network node, wherein the second QoS notification indicates that one or more QoS requirements associated with a PDU session of a client device application will not be met in a radio access network; set up dual connectivity for at least one of the PDU session and a QoS flow of the PDU session based on the second QoS notification.

An advantage of the master node according to the third aspect is that through the second QoS notification, the master network node can trigger a corrective action, such as initiating dual connectivity. Thereby, the necessity of having to downgrade the QoS of a currently active PDU session might be minimized or fully avoided.

In an implementation form of a master node according to the second aspect, the second QoS notification further indicates one or more of: a QFI list, a QoS profile to each QFI, a PDU session identity, a list of suggested secondary nodes, a PDU session level TNL address, and a PDU session level network slice information associated to the suggested secondary nodes.

An advantage with this implementation form is that the first network node provides extended information to the master node so that the master node can identify one or more the correct PDU sessions or QoS flows for which dual connectivity has to be initiated.

In an implementation form of a master node according to the second aspect, the second QoS notification is received from the first network node via an access and mobility management function.

An advantage with this implementation form is that the first network node can reuse the existing interface between the access and mobility management function and the master node to deliver the second QoS notification. Thereby, a backwards compatible solution is provided and no new interface has to be defined which can be challenging from a system design point of view.

In an implementation form of a master node according to the second aspect, the master node being configured to provide a client device capability indication to the first network node via access and mobility management function, wherein the client device capability indication indicates the capabilities of the client device.

An advantage with this implementation form is that the first network node provided by client device capability indication from the master node can identify whether the client device supports dual connectivity or not and/or which types of dual connectivity that are supported by the client device. Further, which secondary nodes that can be matched with the client device capability can be determined by the first network node.

In an implementation form of a master node according to the second aspect, the client device capability indication indicates supported radio access frequencies of the client device.

An advantage with this implementation form is that the first network node provided by client device capability indication from the master node can identify whether the client device supports dual connectivity or not and/or which types of dual connectivity that are supported by the client device. Further, which secondary nodes that can be matched with the client device capability can be determined by the first network node.

According to a fourth aspect of the invention, the above mentioned and other objectives are achieved with a method for a first network node, the method comprises obtaining one or more Quality-of-Service (QoS) requirements associated with a protocol data unit, PDU, session of a client device application; and when the one or more QoS requirements will not be met in a core network, transmitting a first QoS notification to a second network node, wherein the first QoS notification indicates that the one or more QoS requirements will not be met in the core network; and when the one or more QoS requirements will not be met in a radio access network, transmitting a second QoS notification to a master node, wherein the second QoS notification indicates that the one or more QoS requirements will not be met in the radio access network.

The method according to the fourth aspect can be extended into implementation forms corresponding to the implementation forms of the first network node according to the first aspect. Hence, an implementation form of the method comprises the feature(s) of the corresponding implementation form of the first network node.

The advantages of the methods according to the fourth aspect are the same as those for the corresponding implementation forms of the first network node according to the first aspect.

According to a fifth aspect of the invention, the above mentioned and other objectives are achieved with a method for a second network node, the method comprises receiving a first QoS notification from a first network node, wherein the first QoS notification indicates that one or more QoS requirements associated with a PDU session of a client device application will not be met in a core network; setting up one or more traffic paths for the PDU session or establish an additional PDU session for the client device application based on the first QoS notification.

The method according to the fourth aspect can be extended into implementation forms corresponding to the implementation forms of the second network node according to the second aspect. Hence, an implementation form of the method comprises the feature(s) of the corresponding implementation form of the second network node.

The advantages of the methods according to the fifth aspect are the same as those for the corresponding implementation forms of the second network node according to the second aspect.

According to a sixth aspect of the invention, the above mentioned and other objectives are achieved with a method for a master node, the method comprises receiving a second QoS notification from a first network node, wherein the second QoS notification indicates that one or more QoS requirements associated with a PDU session of a client device application will not be met in a radio access network; setting up dual connectivity for at least one of the PDU session and a QoS flow of the PDU session based on the second QoS notification.

The method according to the sixth aspect can be extended into implementation forms corresponding to the implementation forms of the master node according to the third aspect. Hence, an implementation form of the method comprises the feature(s) of the corresponding implementation form of the third network node.

The advantages of the methods according to the sixth aspect are the same as those for the corresponding implementation forms of the master node according to the third aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION OF ILLUSTRATIVE EMBODIMENTS

As previously mentioned, IQNs have been introduced for NR 5G. IQNs can be generated by an appropriate Network Function (NF) belonging to the 5G system, such as Network Data Analytics Function (NWDAF). However, for simplicity by focusing on its functionalities, it is assumed that a logical entity called Prediction Function (PF) takes the role of collecting required data in order to predict QoS and delivering predicted QoS information. An IQN basically includes predicted QoS information, which can be per QoS flow or per PDU session or per application or per UE. Such predicted QoS may be lower than currently supported QoS and thus might lead to the degradation of the user service experience by taking a selected application reaction. However, if the network can afford to take countermeasures based on the predicted QoS change with appropriate network reactions, it can be possible to mitigate the impact that can be caused by the potential QoS change and as a result, the application reaction to deal with QoS degradation does not have to be executed. This means that the service experience of the UE application can be managed without QoS decrease.

The inventors have realized that network countermeasure in response a potential QoS degradation can enable the UE to keep its pre-agreed QoS without having to downgrade its QoS contrary to conventional solutions in which, in response to predicted QoS degradation, the UE might downgrade its QoS level, for example, by modifying the PDU session with lower QoS configuration, in order to avoid the potential impact that can be caused by keeping the current QoS configuration when the actual QoS degradation happens.

Therefore, according to embodiments of the invention the use of network reactions, i.e., Traffic Redundancy (TR) and/or Dual Connectivity (DC) in response to an IQN, in order to address or mitigate the impact that can be caused by a potential QoS change based on a QoS prediction is provided. With network reactions, the application might not need to change its QoS to avoid the future impact, possibly keeping the current QoS configuration without initiating or executing an application reaction.

For example, based on the QoS prediction, if the CN's QoS is predicted to be degraded in terms of data rate, latency, reliability, compared to given thresholds of those KPIs, on the current traffic path, an in-advance QoS notification will be sent to the SMF to trigger the TR mechanism with a list of suggested UPFs predicted to be with better QoS. If the RAN's QoS is predicted to be degraded in terms of data rate, latency, reliability, compared to given thresholds of those KPIs, on the current radio connectivity, an in-advance QoS notification will be sent to the Master RAN Node (MN) to trigger the DC mechanism with a list of suggested SNs predicted to be with better QoS. If the both CN and RAN are predicted to be degraded in terms of data rate, latency, reliability, compared to given thresholds of those KPIs, an in-advance QoS notification will be sent to the SMF and MN to trigger the TR and DC, with a list of suggested UPFs and SNs predicted to be with better QoS, respectively.

TR aims at establishing a redundant traffic path while keeping the main traffic path over UPFs for increasing reliability in delay-critical communications. DC means that the UE has dual radio connectivity from the MN and a secondary RAN node (SN) for better throughput and reliability. Those solutions are based on an overprovisioning approach, therefore, keeping a redundant path with TR all the time would waste network resource while the network is in a good quality. Also, connecting to two RAN nodes by a UE at all the time is quite expensive as well as being unnecessary except for applications with higher throughput demand. Exploiting them as in-advance network reactions on demand for enhancing user service experience with QoS predictions is effective and efficient and will bring a significant value for vertical use cases in which high reliability and low latency are required. Associating in-advance network reactions with IQN can provide an effective solution on demand to address or mitigate the impact that can be caused by a potential QoS change, without initiating application reactions that may bring down the QoS level of the application.

However, for network reactions to be utilized with IQN, the inventors have also identified that the following issues have to be considered and solved:

Issue 1: what request and/or information is needed to be provided by in-advance QoS notification with QoS prediction for SMF to initiate the TR?

Issue 2: what request and/or or information is needed to be provided by in-advance QoS notification with QoS prediction for a MN to initiate DC?

Issue 3: how does a PF get UE capability information regarding the support and specific capability for DC?

These issues are also addressed by embodiments of the invention in the present disclosure.

Figure 1:
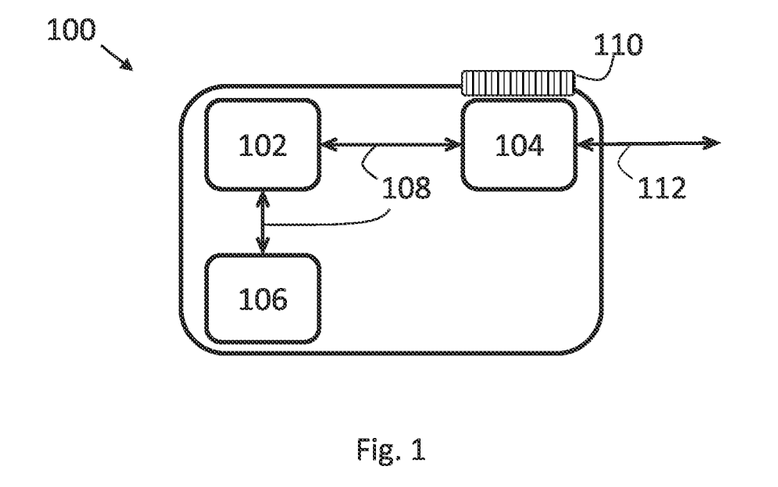
FIG. 1 shows a first network node according to an example of the invention.

FIG. 1 shows a first network node 100 according to an embodiment of the invention. In the embodiment shown in FIG. 1, the first network node 100 comprises a processor 102, a transceiver 104 and a memory 106. The processor 102 is coupled to the transceiver 104 and the memory 106 by communication means 108 known in the art. The first network node 100 may be configured for both wireless and wired communications in wireless and wired communication systems, respectively. The wireless communication capability is provided with an antenna or antenna array 110 coupled to the transceiver 104, while the wired communication capability is provided with a wired communication interface 112 coupled to the transceiver 104. That the first network node 100 is configured to perform certain actions can in this disclosure be understood to mean that the first network node 100 comprises suitable means, such as e.g. the processor 102 and the transceiver 104, configured to perform said actions.

According to embodiments of the invention the first network node 100 is configured to obtain one or more QoS requirements associated with a PDU session of a client device 200 application. The first network node 100 is further configured to at least one of: when the one or more QoS requirements will not be met in a core network 610, transmit a first QoS notification 602 to a second network node 300, wherein the first QoS notification 602 indicates that the one or more QoS requirements will not be met in the core network (610); and when the one or more QoS requirements will not be met in a radio access network 620, transmit a second QoS notification 604 to a master node 400, wherein the second QoS notification 604 indicates that the one or more QoS requirements will not be met in the radio access network 620.

The core network 610 and the radio access network 620 are parts of the wireless communication system 600.

Figure 2:
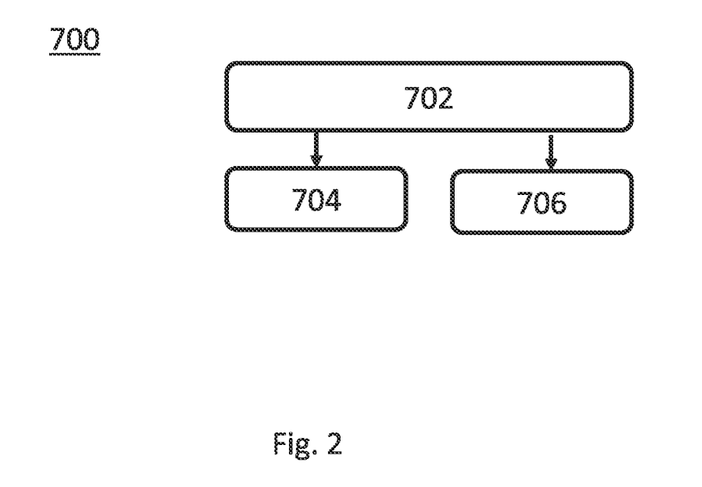
FIG. 2 shows a method for a first network node according to an example of the invention.

FIG. 2 shows a flow chart of a corresponding method 200 which may be executed in a first network node 100, such as the one shown in FIG. 1. The method 700 comprises obtaining 702 one or more QoS requirements associated with a PDU session of a client device 200 application; and when the one or more QoS requirements will not be met in the core network 610, transmitting 704 a first QoS notification 602 to a second network node 300, wherein the first QoS notification 602 indicates that the one or more QoS requirements will not be met in the core network 610; and when the one or more QoS requirements will not be met in the radio access network 620, transmitting 706 a second QoS notification 604 to a master node 400, wherein the second QoS notification 604 indicates that the one or more QoS requirements will not be met in the radio access network 620.

Figure 3:
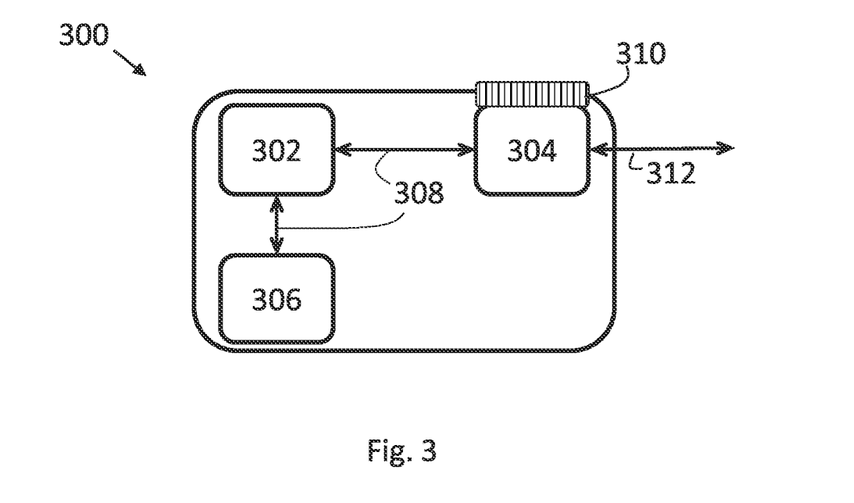
FIG. 3 shows a second network node according to an example of the invention.

FIG. 3 shows a second network node 300 according to an embodiment of the invention. In the embodiment shown in FIG. 1, the second network node 300 comprises a processor 302, a transceiver 304 and a memory 306. The processor 302 is coupled to the transceiver 304 and the memory 306 by communication means 308 known in the art. The second network node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the second network node 300 is configured to perform certain actions can in this disclosure be understood to mean that the second network node 300 comprises suitable means, such as e.g. the processor 302 and the transceiver 304, configured to perform said actions.

According to embodiments of the invention the second network node 300 is configured to receive a first QoS notification 602 from a first network node 100, wherein the first QoS notification 602 indicates that one or more QoS requirements associated with a PDU session of a client device 200 application will not be met in a core network 610. The second network node 300 is further configured to set up one or more traffic paths for the PDU session or establish an additional PDU session for the client device 200 application based on the first QoS notification 602.

Figure 4:
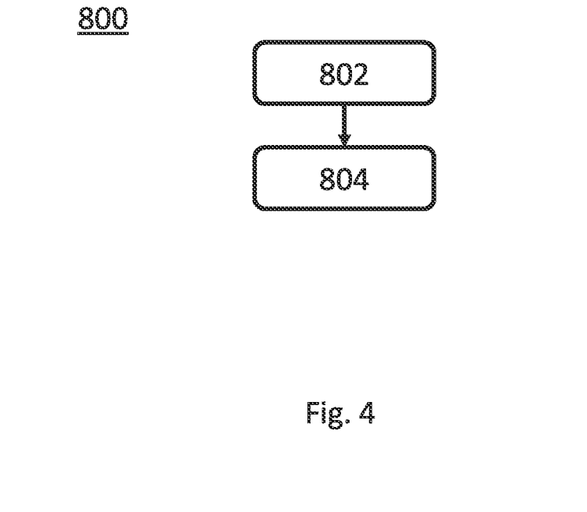
FIG. 4 shows a method for a second network node according to an example of the invention.

FIG. 4 shows a flow chart of a corresponding method 800 which may be executed in a second network node 300, such as the one shown in FIG. 3. The method 800 comprises receiving 802 a first QoS notification 602 from a first network node 100, wherein the first QoS notification 602 indicates that one or more QoS requirements associated with a PDU session of a client device 200 application will not be met in a core network 610. The method 800 further comprises setting up 804 one or more traffic paths for the PDU session or establish an additional PDU session for the client device 200 application based on the first QoS notification 602.

Figure 5:
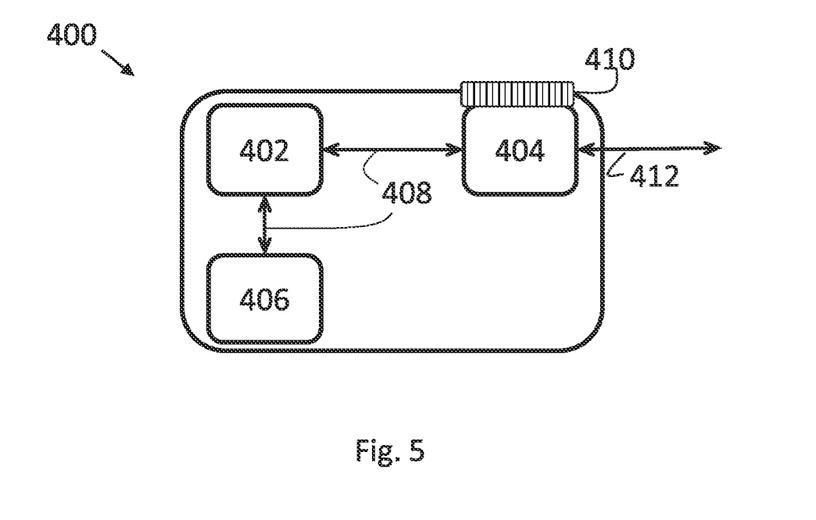
FIG. 5 shows a master node according to an example of the invention.

FIG. 5 shows a master node 400 according to an embodiment of the invention. In the embodiment shown in FIG. 1, the master node 400 comprises a processor 402, a transceiver 404 and a memory 406. The processor 402 is coupled to the transceiver 404 and the memory 406 by communication means 408 known in the art. The master node 400 may be configured for both wireless and wired communications in wireless and wired communication systems, respectively. The wireless communication capability is provided with an antenna or antenna array 410 coupled to the transceiver 404, while the wired communication capability is provided with a wired communication interface 412 coupled to the transceiver 404. That the master node 400 is configured to perform certain actions can in this disclosure be understood to mean that the master node 400 comprises suitable means, such as e.g. the processor 402 and the transceiver 404, configured to perform said actions.

According to embodiments of the invention the master node 400 is configured to receive a second QoS notification 604 from a first network node 100, wherein the second QoS notification 604 indicates that one or more QoS requirements associated with a PDU session of a client device (200) application will not be met in a radio access network 620. The master node is further configured to set up dual connectivity for at least one of the PDU session and a QoS flow of the PDU session based on the second QoS notification 604.

Figure 6:
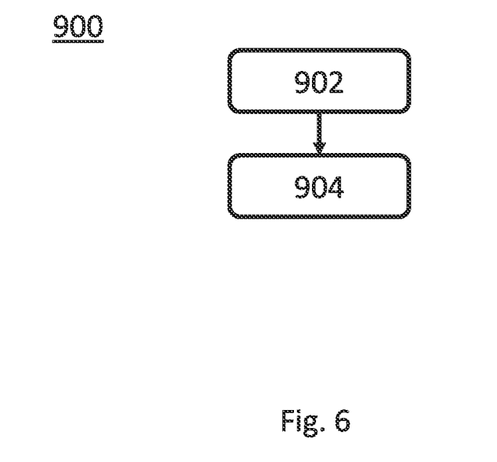
FIG. 6 shows a method for a master node according to an example of the invention.

FIG. 6 shows a flow chart of a corresponding method 900 which may be executed in a master node 400, such as the one shown in FIG. 5. The method 900 comprises receiving 902 a second QoS notification 604 from a first network node 100, wherein the second QoS notification 604 indicates that one or more QoS requirements associated with a PDU session of a client device 200 application will not be met in a radio access network 620. The method further comprises setting up 904 dual connectivity for at least one of the PDU session and a QoS flow of the PDU session based on the second QoS notification 604.

Figure 7:
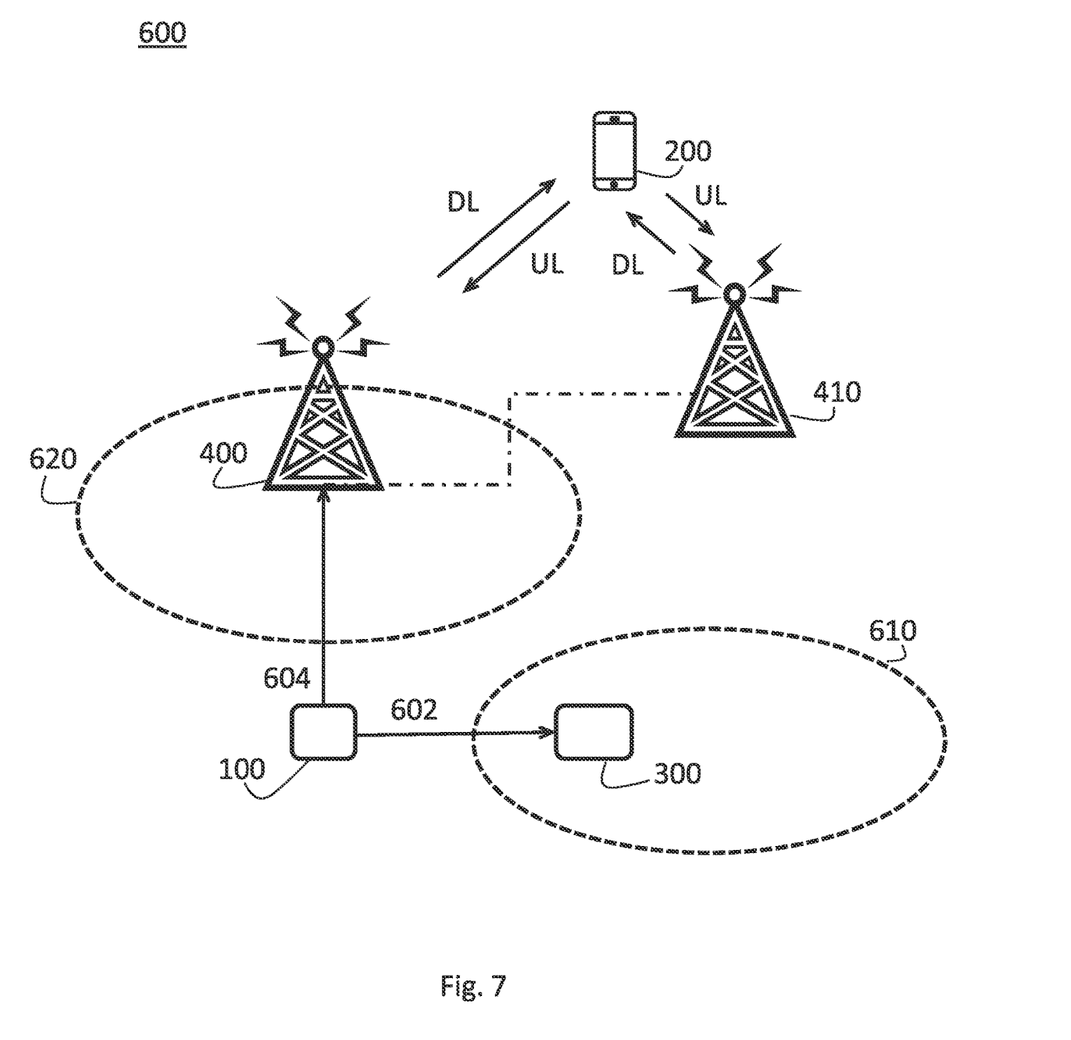
FIG. 7 shows a wireless communication system according to an example of the invention.

FIG. 7 shows a wireless communication system 500 according to an embodiment of the invention. The wireless communication system 500 comprises a MN 400 and a SN 410 and a client device 200 configured to operate in the wireless communication system 500. The client device 200 may e.g. be in RRC connected state with the MN 400 and the SN 410 in this DC scenario and hence communicate in the downlink (DL) and/or the uplink (UL) with the MN 400 and the SN 410. Mentioned MN 400 and SN 410 are connected to each other with suitable communication interfaces illustrated with the dotted-dashed line. The wireless communication system 500 in FIG. 7 further comprises a RAN 620 and an associated CN 610. A first network node 100 is configured to communicate with the MN 400 and a second network node 300 using suitable communication interfaces and protocols given by standards, such as NR. According to embodiments of the invention the first network node 100 transmits a first QoS notification 602 to the second network node 300 when one or more QoS requirements will not be met in the CN 610 and/or transmits a second QoS notification 604 to the MN 400 when the one or more QoS requirements will not be met in the RAN 620.

Figure 8:
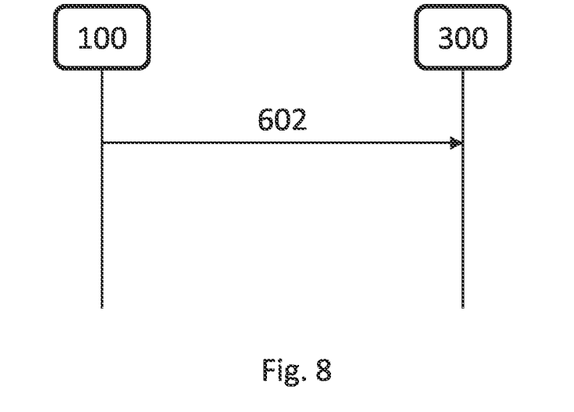
FIG. 8 illustrates signaling between a first network node and a second network node.

FIG. 8 illustrates the case when the first network node 100 determines that the one or more QoS requirements will not be met in the CN 610. More particularly, the first network node 100 determines that the one or more QoS requirements will not be met in the CN 610 based on obtained one or more QoS requirements and one or more QoS threshold values associated with the CN 610. In embodiments of the invention, the one or more threshold values associated with the CN 610 are one or more of: data rate, latency, and reliability or packet delivery ratio.

Upon determining that such a situation has occurred in the CN 610, the first network node 100 sends a first QoS notification 602 to a secondary network node 300 as previously described. However, in embodiments of the invention, the first QoS notification 602 can further indicate one or more of: a PDU session identity, a client device IP address, an Internal Group identity, an Application Function Transaction identity, and a Data Network Name.

Figure 9:
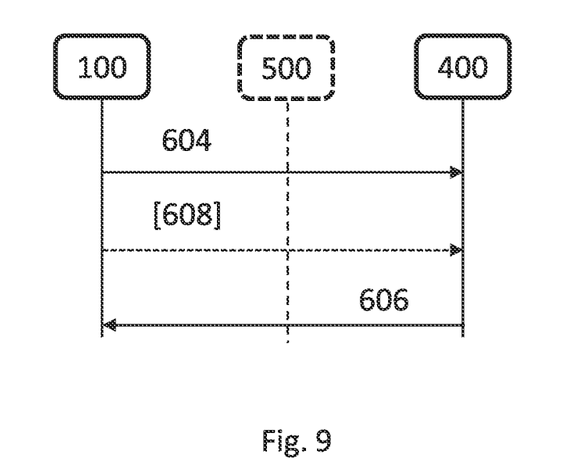
FIG. 9 illustrates signaling between a first network node and a master node.

FIG. 9 on the other hand illustrates the case when the first network node 100 determines that one or more QoS requirements will not be met in the RAN 620. More particularly, the first network node 100 determines that the one or more QoS requirements will not be met in the RAN 620 based on obtained QoS requirements and one or more QoS threshold values associated with the RAN 620. In embodiments of the invention, the one or more threshold values associated with the RAN 620 are one or more of: data rate, latency, and reliability or packet delivery ratio.

Upon determining such a situation has occurred in the RAN 620, the first network node 100 sends a second QoS notification 604 to a MN 400 as previously described. However, in embodiments of the invention, the second QoS notification 604 can further indicate one or more of QFI list, QoS profile of each QFI, PDU session identity, a list of suggested SNs, a PDU session level TNL address, and a PDU session level network slice information of the suggested SNs. As also illustrated in FIG. 9 the second QoS notification 604 can be transmitted to the MN 400 via an AMF 500.

Furthermore, since for DC the first network node 100 may need to know the capabilities of the client device 200 for improved performance, the first network node 100 obtains a client device capability indication 606 from the MN 400 as shown in FIG. 9. The client device capability indication 606 indicates the capabilities of the client device 200, such as supported RAT type, its specific capability, and its supported band list. In an embodiment of the invention, first network node 100 receives the client device capability indication 606 from the AMF 500 in response to a transmission of a client device capability enquiry 608 to the AMF 500 which is illustrated with the dashed arrow in FIG. 9. In embodiments of the invention the client device capability indication 606 indicates supported radio access frequencies of the client device 200. This capability information is used by the first network node 100 so as to know the support for DC by the client device 200.

To provide even deeper understanding of the invention further embodiments of the invention will now be described with reference to the signaling diagrams in FIGS. 10-13. For easier understanding of enablement of embodiments of the invention, the herein disclosed embodiments are set in a 3GPP NR 5G context. This means that system design, terminology, protocols, etc. from NR are used to describe mentioned embodiments. Hence, in FIGS. 10-13 the first network node 100 is a PF, the second network node 300 is a SMF, and the client device 200 is a UE. Embodiments of the invention are however not limited thereto. In FIGS. 10-13 the following network entities are shown: UE—user equipment, MN—master RAN node (i.e. the master node 400 herein), SN—secondary RAN node, SMF—session management function (i.e. the second network node 300 herein), UPF—user plane function, AMF—access and mobility management function, PF—prediction function (i.e. the first network node 100 herein), PCF—policy control function, and NWDAF—network data analytics function.

Figure 10:
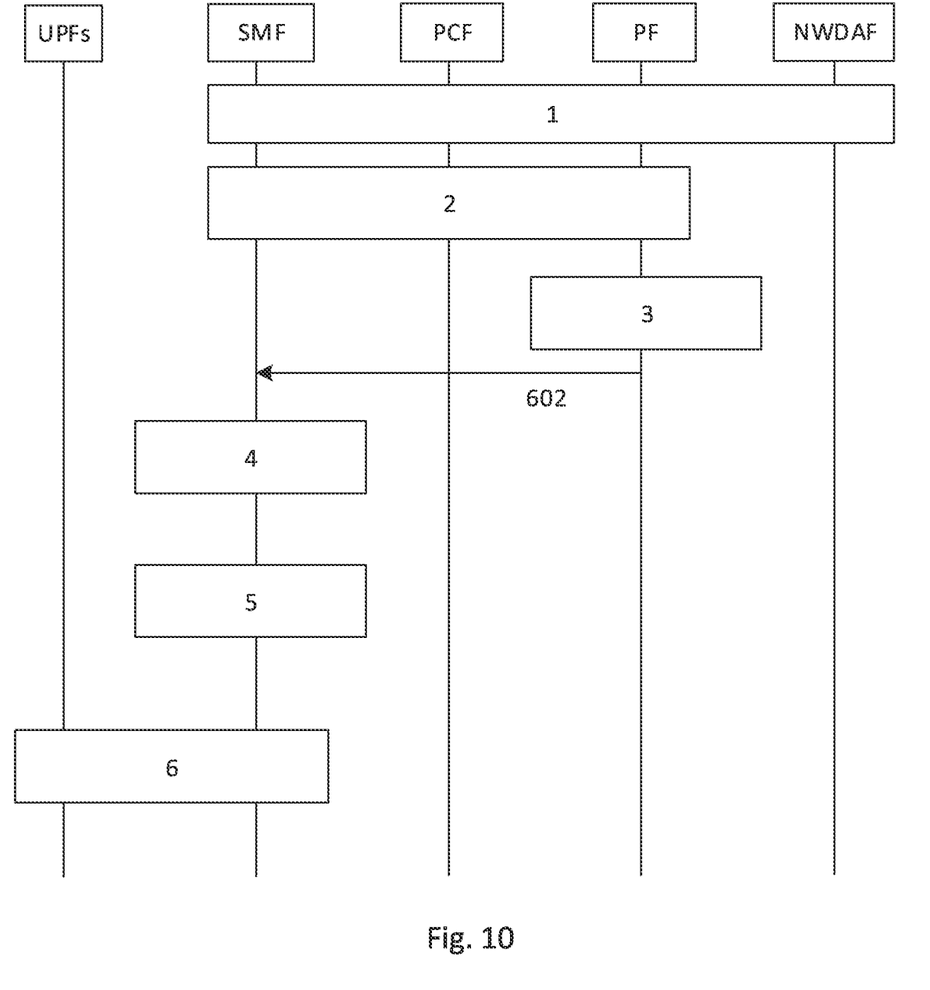
FIG. 10 shows a signaling diagram according to an example of the invention.

Regarding issue 1 as previously described a solution is provided with a proposed IQN-triggered traffic redundancy procedure for in-advance network reaction as shown in FIG. 10. Issue 1 was stated as: what request and/or information is needed to be provided by in-advance QoS notification with QoS prediction for SMF to initiate TR?

At step 1 in FIG. 10, a SMF and a PF are subscribed to NWDAF for NWDAF analytics information service, as NWDAF consumers. The PF can request to get collected data from NWDAF or OAM, or can collect necessary data from NFs that store and manage the data the PF needs to collect for generating the QoS predictions.

At step 2 in FIG. 10, the SMF is also subscribed to the PF for in-advance QoS notification service, as a PF consumer. The PF can e.g. collect Internal Group ID, application function (AF) Transaction ID, and Data Network Name (DNN) as well as congestion information on the current traffic path from NWDAF. In addition, the PF can request to get collected data of specific NF or AF collected from NWDAF. The PF as a logical entity generates predictions based on collected data from NFs or NWDAF. The PF can be physical integrated with other NFs; whole functionality can be integrated with a specific NF or split into multiple NFs with a piece of the functionality.

At step 3 in FIG. 10, the PF generates an IQN message, corresponding to the first QoS notification 602, with QoS prediction on the current traffic path. The IQN message is sent from the PF to the SMF illustrated with the arrow. The IQN message basically includes PDU Session ID and UE IP address. If available, Internal Group ID, AF Transaction ID, and DNN can be included to efficiently indicate a group of PDU sessions to be applied by the TR mechanism. Internal Group ID is provided by the UDM and managed by the SMF, which may use it to apply local policies for a group of PDU sessions. The Internal Group ID can be used to indicate the PDU session grouped with a similar QoS characteristics. AF Transaction ID is generated by an AF when it sends an AF's request to the PCF for influencing on traffic routing. The AF Transaction ID can be used to indicate the PDU sessions influenced by the same AF's request. The DNN can be used to indicate the PDU sessions belonging to the same operator services or external access or $3^{rd}$ party services. Using those parameters may be resource-efficient to indicate multiple PDU sessions. In order to utilize the given group IDs for an efficiency reason, SMF's subscription in PF can be per PDU session or per Internal Group ID or per AF Transaction ID or per DNN. The IQN message also includes the predicted QoS information, i.e., date rate, latency, reliability among UPFs on the current traffic path. It also includes a list of the suggested UPFs that are predicted to be with better QoS. Suggested branching points for DL and UL traffic can also be included.

At step 4 in FIG. 10, the SMF checks whether there is/are any PDU session(s) matching or associated with the PDU Session ID and/or UE IP and/or Internal Group ID and/or AF ID and/or DNN included in the IQN message. If there exists, the SMF compares the matching (predicted) QoS KPIs (i.e., predicted data rate, predicted latency, and predicted reliability) in the IQN message with the QoS KPI thresholds in the SMF, delivered from PCF, whether any of the KPI values in the IQN message crosses the threshold of the matching KPI value(s). From the comparison, with any identified QoS KPI that crossed the threshold, the SMF can initiate the TR mechanism to complement the current traffic path where the QoS requirements will not be met in a future. But the decision of QoS KPI thresholds to initiate the traffic redundancy mechanism depends on operator's network policy. Further, the QoS KPI thresholds can be changed with update by the PCF or with statistics/analytics information indicating the actual number and percentage of QoS predictions managed by the SMF. The TR mechanism is applied and initiated per PDU session, though the number of the matching PDU sessions can be identified with various group IDs such as Internal Group ID or AF Transaction ID or DNN in the SMF.

At step 5 in FIG. 10, an operator has multiple traffic routing policies that can be applied and enforced in the network. The selection of the traffic routing policy depends on an operator's traffic routing policy principle. Due to the resource unavailability, the TR might not be triggered by the SMF. Here, it is assumed that the traffic routing policy with the TR is selected by an operator's traffic routing policy with resource availability when a network reaction is required on the QoS change prediction.

At step 6 in FIG. 10, the SMF determines a redundant traffic path to be established for the PDU session or a newly established PDU session with the list of suggested UPFs predicted to be with better QoS and selected branching points for DL and UL traffic, included in the IQN message. The forwarding action rules sent by the SMF are configured into the selected UPFs. A redundant traffic path can also be established by creating an additional PDU session. The redundant traffic path can be established over different UPFs compared to the ones for the existing traffic path, or the same path with the existing traffic in various tunneling mechanisms.

Figure 11:
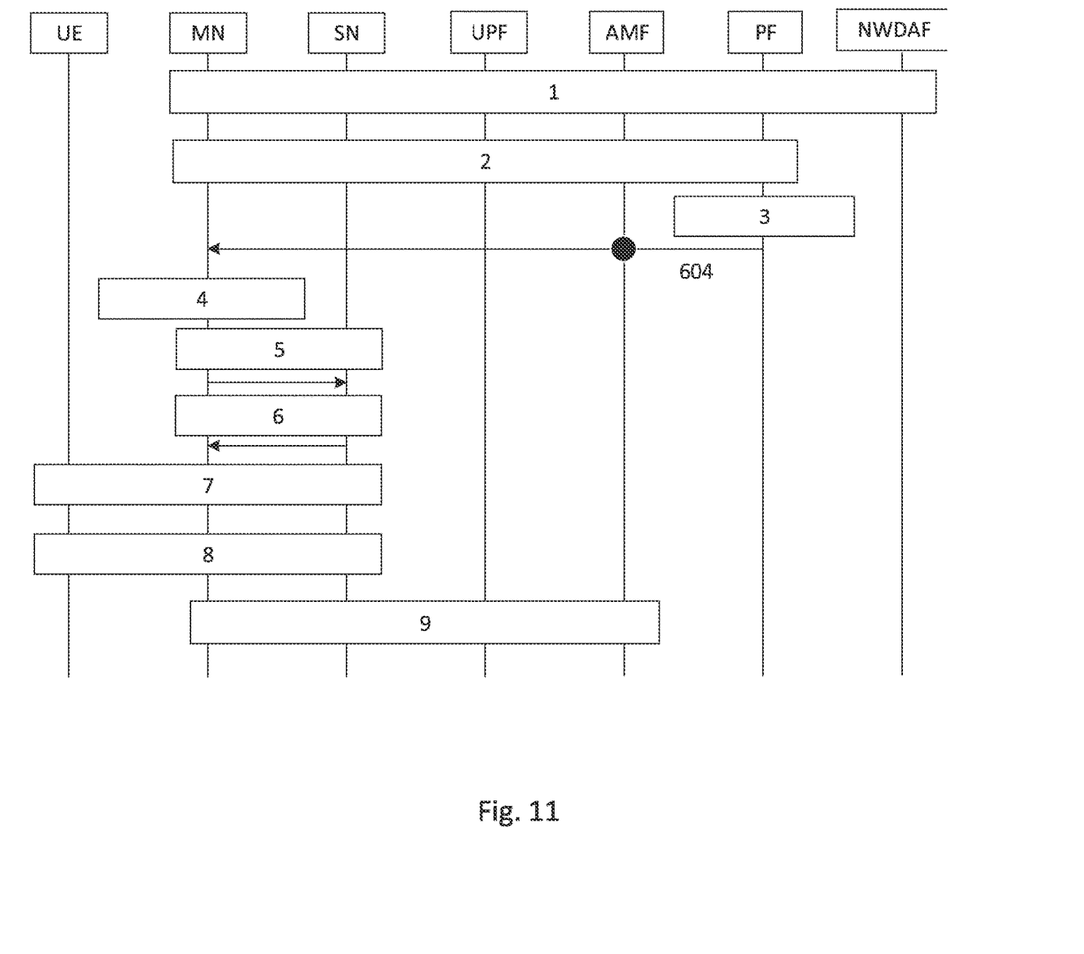
FIG. 11 shows another signaling diagram according to an example of the invention.

Moreover, regarding issue 2 previously described a solution is provided with the proposed IQN-triggered DC procedure as in-advance network reaction as shown in FIG. 11. Issue 2 was stated as: what request and/or information is needed to be provided by in-advance QoS notification with QoS prediction for a MN to initiate DC?

At step 1 in FIG. 11, RAN nodes (i.e., a MN and a SN) and the PF are subscribed to NWDAF for NWDAF analytics information service, as NWDAF consumers.

At step 2 in FIG. 11, the RAN nodes are also subscribed to PF for the in-advance QoS prediction notification service as PF consumers. The PF can request to get collected data from NWDAF or OAM, or can collect necessary data from NFs that store and manage the data the PF needs to collect for generating the QoS predictions. In addition, the PF can request to get collected data directly from each RAN node or via AMF.

At step 3 in FIG. 11, an IQN message, corresponding to the second QoS notification 604, is sent to the MN by the PF via AMF (illustrated with the black dot), including QFI list, QoS profile list, and one or more PDU session IDs. The IQN message also includes the predicted QoS information, i.e., date rate, latency, reliability of the MN, and a list of the suggested SNs that are predicted to be with better QoS, with PDU session level TNL address information and PDU session level network slice information associated to the suggested SNs. The IQN message is illustrated with the arrow from the PF to the MN via the AMF.

Once the MN receives the IQN message, the MN compares the matching (predicted) QoS KPIs (i.e., data rate, latency, reliability) in the IQN message with the QoS KPI thresholds configured in the MN, whether any of the KPI values in the IQN message crosses the threshold of the matching KPI value(s). From the comparison, with any identified QoS KPI that crossed the threshold, the MN can initiate DC for one or more QoS flows or PDU sessions to complement the UE's connectivity. MN's initiation for DC in PF can be per QoS flow or per PDU session. The decision of QoS KPI thresholds to initiate the DC depends on operator's network policy. The QoS KPI thresholds can be changed with update by the AMF or with statistics/analytics information indicating the actual number and percentage of QoS predictions managed by the MN. From the list of the suggested SNs, the MN may try to measure radio quality of suggested SNs to select one SN among the suggested SNs for one or more QoS flows or PDU sessions.

At step 4 in FIG. 11, the MN selects one of the suggested SNs for the DC.

At step 5 in FIG. 11, the MN requests the selected target SN to allocate radio resources for one or more PDU sessions or QoS flows, indicating QoS flows characteristics (e.g., QoS flow level QoS parameters, PDU session level TNL address information, and PDU session level network slice info), following section 10.2.2 MR-DC with 5GC in 3GPP TS 37.340. The request is sent to the SN using a SN addition request message illustrated with the arrow from the MN to the SN.

At step 6 in FIG. 11, the SN responds to the SN addition request from the MN and returns a SN addition request acknowledge message including SN RRC configuration message illustrated with the arrow from the SN to the MN.

At step 7 in FIG. 11, the MN sends the MN RRC reconfiguration message to the UE including the SN RRC configuration message received in the SN additional request acknowledge. The UE applies the new configuration and replies to MN with MN RRC reconfiguration complete message.

At step 8 in FIG. 11, the UE may perform the Random Access procedure and the MN may sends SN Status Transfer to the SN in a condition described in following section 10.2.2 MR-DC with 5GC in 3GPP TS 37.340

At step 9 in FIG. 11, for SN terminated bearers, the update of the user plane path towards the 5GC is performed via PDU Session Path Update procedure.

More details of steps 6 to 9 in FIG. 11 can be found in section 10.2.2 MR-DC with 5GC in 3GPP TS 37.340.

Figure 12:
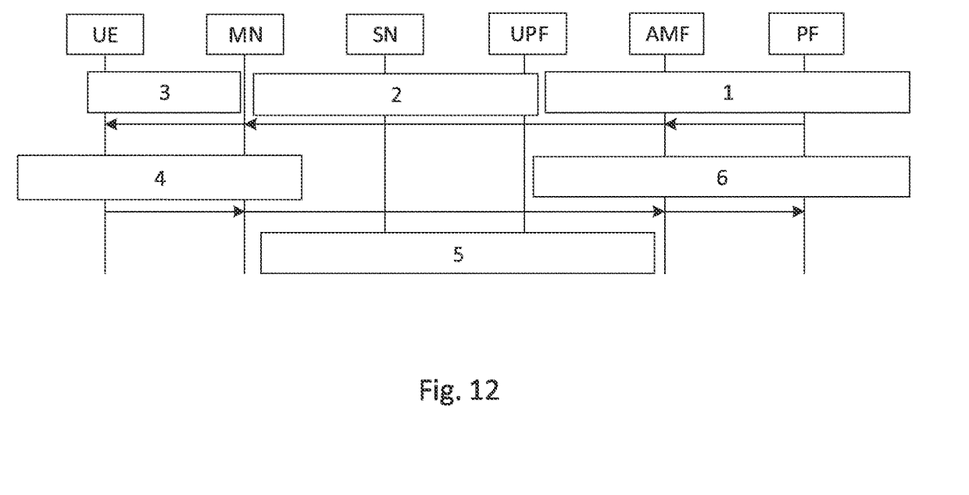
FIG. 12 shows yet another signaling diagram according to an example of the invention.
Figure 13:
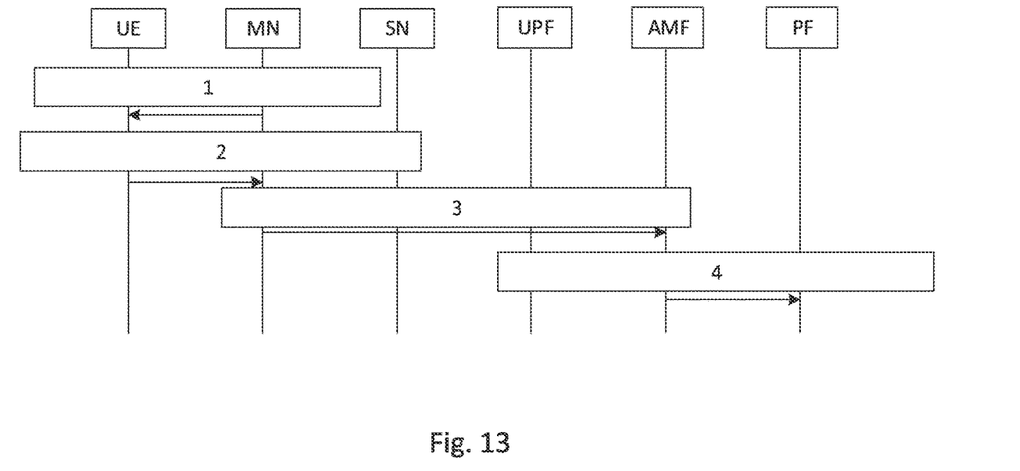
FIG. 13 shows yet another signaling diagram according to an example of the invention.

Regarding issue 3 previously described two different solutions are presented as shown in FIGS. 12 and 13, respectively. Issue 3 was stated as: how does the PF get UE capability information regarding the support and specific capability for dual connectivity? The UE capability information herein corresponds to client device capability information.

FIG. 12 illustrates a first solution to how the PF derives the UE capability information to know the support for DC. When the RAN resource is available and the DC is approved by the operator's policy, initiating DC depends on the UE capability regarding supported RAT type and its specific capability, for example, including the type of DC the UE supports and can simultaneously connect to 4G and 5G base station and supported band list of the UE for the DC support. With the UE capability information, the PF can send a list of suggested SNs suited on the UE RAT capability. If there is no matching SNs near the UE, the PF can avoid to send an unnecessary IQN message to the UE. A procedure to obtain UE capability information by the PF is as follows:

At step 1 in FIG. 12, the PF inquiries to the AMF about the UE capability regarding supported RAT type and its specific capability and supported band list for the RAT, by extending the UE Capability Transfer procedure in 3GPP TS 36.331 into between MN and AMF and between AMF and PF or UE Capability Match Request/Response procedure in 3GPP TS 23.502, into between AMF and PF.

At step 2 in FIG. 12, upon receiving the UE capability enquiry message or UE capability match request message from the PF, if the AMF has not already received the UE radio capabilities from the MN, the AMF requests the MN to send the UE capability information.

At step 3 in FIG. 12, upon receiving the UE capability enquiry message or UE capability match request message from the AMF, if the MN has not already received the UE radio capabilities from the UE, the MN requests the UE to send the UE radio capability information.

At step 4 in FIG. 12, the UE provides the MN with its UE capability information by UE capability information message or UE capability match response message.

At step 5 in FIG. 12, upon receiving the UE capability information from the UE, the MN provides the UE capability information to the AMF by UE capability information message or UE capability match response message.

At step 6 in FIG. 12, upon receiving the UE capability information from the MN, the AMF provides the UE capability information to the PF by UE capability information message or UE capability match response message.

FIG. 13 shows another solution for how the PF derives the UE capability information so as to know the support for DC.

At step 1 in FIG. 13, the MN sends the UE capability enquiry message to the UE to get the UE capability information.

At step 2 in FIG. 13, the UE provides the UE capability information to the MN by the UE capability information message.

At step 3 in FIG. 13, once the MN receives the UE capability information regarding the supported RAT type and its specific capability and supported band list for the RAT in response to the MN's UE Capability Enquiry message, the MN sends the information to the AMF by the UE Capability Info Indication message given in 3GPP TS 36.413. The UE Capability Info Indication message is extended with added supported band list for NR, which is an important information element for the PF to decide a suited SN for DC.

At step 4 in FIG. 13, the AMF sends the UE Capability Info Indication received from the MN at step 3 in FIG. 13, by reusing the UE Capability Info Indication message added with supported band list for NR into from AMF to PF Hence, the UE capability information can be shared with the PF. This procedure allows the PF to be updated about the DC support and capability of the UE according to TS 36.413 whenever the AMF is updated from the MN.

The client device 200 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network node 100, the second network node 300, and the master node 400 comprise the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first network node 100, the second network node 300, and the master node 400 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A network node for a communication system, wherein the network node is configured to act as a second network node, and the network node comprises:
   at least one processor; and
   a non-transitory computer readable storage medium storing instructions that are executable by the at least one processor, the instructions comprising instructions to:
      receive a first Quality of Service (QOS) notification from a first network node, wherein the first QoS notification includes predicted QoS information and a Data Network Name (DNN); and
      determine whether a redundant transmission will be performed for a packet data unit (PDU) session based on the predicted QoS information in the first QoS notification.

2. The network node according to claim 1, wherein the predicted QoS information includes at least one of:
   a predicted data rate or predicted latency.

3. The network node according to claim 1, wherein the instructions further include instructions to:
   initiate the redundant transmission based on one or more of:
      a comparison between a predicted QoS key performance indicator (KPI) and a QoS KPI threshold; or
      an operator's traffic routing policy.

4. The network node according to claim 3, wherein the QoS KPI threshold depends on an operator's network policy.

5. The network node according to claim 1, wherein the first QoS notification further comprises one or more of:
   a packet data unit (PDU) session identity, a client device Internet Protocol address, an Internal Group identity, or an Application Function Transaction identity.

6. The network node according to claim 5, wherein the instructions further include instructions to:
   identify one or more target PDU sessions to which the first QoS notification corresponds, wherein the identifying is based on one or more of:
      the PDU session identity, the client device Internet Protocol address, the Internal Group identity, the Application Function Transaction identity, or the Data Network Name.

7. The network node according to claim 1, wherein the first QoS notification comprises a list of suggested user plane functions (UPFs).

8. The network node according to claim 1, wherein the second network node is subscribed to the first network node for an analytics information service.

9. The network node according to claim 1, wherein the second network node is a session management function (SMF).

10. The network node according to claim 1, wherein the first network node is a Network Data Analytics Function (NWDAF).

11. A network node for a communication system, wherein the network node is configured to act as a first network node, and the network node comprises:
    at least one processor; and
    a non-transitory computer readable storage medium storing instructions that are executable by the at least one processor, the instructions comprising instructions to:
       obtain data from one or more network functions (NFs) or operation and maintenance (OAM) devices;
       generate predicted Quality of Service (QOS) information based on the obtained data; and
       send a first QoS notification to a second network node, wherein the first QoS notification includes the predicted QoS information and a Data Network Name (DNN), and wherein the first QoS notification indicates whether to perform a redundant transmission for a first packet data unit (PDU) session.

12. The network node according to claim 11, wherein the first QoS notification further indicates one or more of:
    a PDU session identity of the first PDU session, a client device Internet Protocol address, an Internal Group identity, or an Application Function Transaction identity.

13. The network node according to claim 11, wherein one or more target PDU sessions correspond to the first QoS notification and are identified based on one or more of:
    a PDU session identity, a client device Internet Protocol address, an Internal Group identity, an Application Function Transaction identity, or the Data Network Name.

14. The network node according to claim 11, wherein the instructions further include instructions to:
    send, to an access and mobility management function, an inquiry of a transmission of a client device capability; and
    receive a client device capability indication from the access and mobility management function in response to the inquiry, wherein the client device capability indication indicates one or more capabilities of the client device.

15. The first network node according to claim 14, wherein the client device capability comprises at least one of:
    a radio access technology (RAT) type, or one or more supported radio access frequencies.

16. The network node according to claim 14, wherein the instructions further include instructions to:
    determine a list of suggested secondary nodes (SNs) based on the client device capability; and
    send, to a further network node, a further QoS notification which comprises the list of suggested SNs.

17. The first network node according to claim 16, wherein the further network node is a Master radio access network (RAN) Node.

18. The network node according to claim 11, wherein the instructions further include instructions to:
    send, to a second network node, the first QoS notification which comprises a list of suggested user plane functions (UPFs).

19. The network node according to claim 11, wherein the second network node is a session management function (SMF).

20. The network node according to claim 11, wherein the first network node is a Network Data Analytics Function (NWDAF).

* * * * *